(12) United States Patent
Lytle

(10) Patent No.: US 9,465,278 B2
(45) Date of Patent: Oct. 11, 2016

(54) CAMERA INTEGRATED WITH MONOPAD AND REMOTE CONTROL

(71) Applicant: Craig Lytle, Los Altos Hills, CA (US)

(72) Inventor: Craig Lytle, Los Altos Hills, CA (US)

(73) Assignee: Craig Lytle, Los Altos Hills, CA (US)

( * ) Notice: Subject to any disclaimer, the term of this patent is extended or adjusted under 35 U.S.C. 154(b) by 0 days.

(21) Appl. No.: 14/487,264

(22) Filed: Sep. 16, 2014

(65) Prior Publication Data

US 2016/0077410 A1    Mar. 17, 2016

(51) Int. Cl.
  *H04N 5/225*      (2006.01)
  *G03B 17/56*     (2006.01)
  *F16M 11/12*     (2006.01)
  *H04N 5/232*     (2006.01)

(52) U.S. Cl.
  CPC ............ *G03B 17/561* (2013.01); *F16M 11/12* (2013.01); *H04N 5/2251* (2013.01); *H04N 5/23206* (2013.01)

(58) Field of Classification Search
  CPC ................................................ G08B 13/19632
  USPC ............................................. 348/211.2, 371
  See application file for complete search history.

(56) References Cited

U.S. PATENT DOCUMENTS

| | | | |
|---|---|---|---|
| 5,384,609 A | 1/1995 | Ogawa et al. | |
| 6,056,450 A * | 5/2000 | Walling | F16M 11/10 352/243 |
| 7,542,588 B2 * | 6/2009 | Ekin | G01S 3/7864 348/143 |
| 2004/0135879 A1 * | 7/2004 | Stacy | G08B 13/19632 348/14.02 |
| 2006/0244826 A1 * | 11/2006 | Chew | G01S 3/7865 348/143 |
| 2007/0064092 A1 * | 3/2007 | Sandbeg | H04N 7/142 348/14.02 |
| 2008/0112699 A1 * | 5/2008 | Huseth | H04N 5/247 396/89 |

* cited by examiner

*Primary Examiner* — Joel Fosselman
(74) *Attorney, Agent, or Firm* — Amin, Turocy & Watson LLP

(57) ABSTRACT

Various embodiments provide for a telescoping monopod or a tripod with a telescoping pole that allows an imaging device to be mounted thereon and be remotely controlled via a mobile device. A mounting assembly on the monopod can include motors that facilitate pan and tilt functionality, and a controller that operates the motors and the imaging device. The controller can control the motors and imaging device based on instruction received wirelessly from a mobile device. A base enclosure in the monopod can include one or more batteries that power the imaging device and mounting assembly and also include memory for digital storage of the images recorded by the imaging device.

22 Claims, 10 Drawing Sheets

CAMERA INTEGRATED WITH MONOPAD AND REMOTE CONTROL

TECHNICAL FIELD

The subject disclosure relates to a camera mounted on a monopod that can be remote controlled via a mobile device.

BACKGROUND

Existing video and still cameras are typically optimized for use while being held by the user. Typically they include some kind of dedicated view finder to allow the user to aim the camera which generally required the user to be near the camera while shooting. This is sometimes inconvenient and limits the views and perspectives that can be captured at events such as school plays, weddings, or youth sports. Newer sports cameras are designed to mounted to skis, surf boards and other sports gear and offer the ability to get unique perspectives. But these don't include zoom, focus, pan, or tilt features and are usually wide angles only. Some surveillance cameras can include motorized pan, tilt, zoom and focus via remote control, but these cameras are not portable, and are generally permanently installed and/or mounted The above-described description is merely intended to provide a contextual overview of current techniques for providing remote controlled imaging devices and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, an apparatus includes a telescoping monopod that has a base enclosure with foldable stabilizing members. The apparatus also includes a mounting assembly that is affixed to a distal end of the monopod from the base member. The mounting assembly also includes a vertical member configured to mount an imaging device thereon, wherein the mounting assembly includes a first motor configured to pan the imaging device in a range of azimuthal angles, and a second motor configured to tilt the imaging device in a range of elevation angles. The apparatus also includes a controller that pans and tilts the imaging device and facilitates operation of the imaging device either in response to instructions received wirelessly via a wireless antenna attached to the mounting assembly or base enclosure or due to autonomous analysis of the captured image. The controller is enclosed within the mounting assembly or base enclosure.

In another example embodiment, a method comprises receiving a control instruction from a mobile device for directional pointing and imaging device operation via a wireless antenna affixed to a monopod. The method also includes panning and tilting an imaging device mounted to the mounting assembly based on the control instruction and recording an image based on the control instruction. The method further includes transmitting the image to the mobile device and storing the image to a memory storage device in a base enclosure of the monopod.

In another example embodiment, a system comprises a processor, and a memory that stores executable instructions that, when executed by the processor, facilitate performance of operations. The operations include receiving a control instruction from a mobile device for directional pointing and imaging device operation via a wireless antenna embedded in a mounting assembly or base enclosure that is affixed to a monopod. The operations also include panning and tilting an imaging device mounted to the mounting assembly based on the control instruction and recording an image based on the control instruction. The operations further include transmitting the image to the mobile device and storing the image to a memory storage device in a base enclosure of the monopod.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
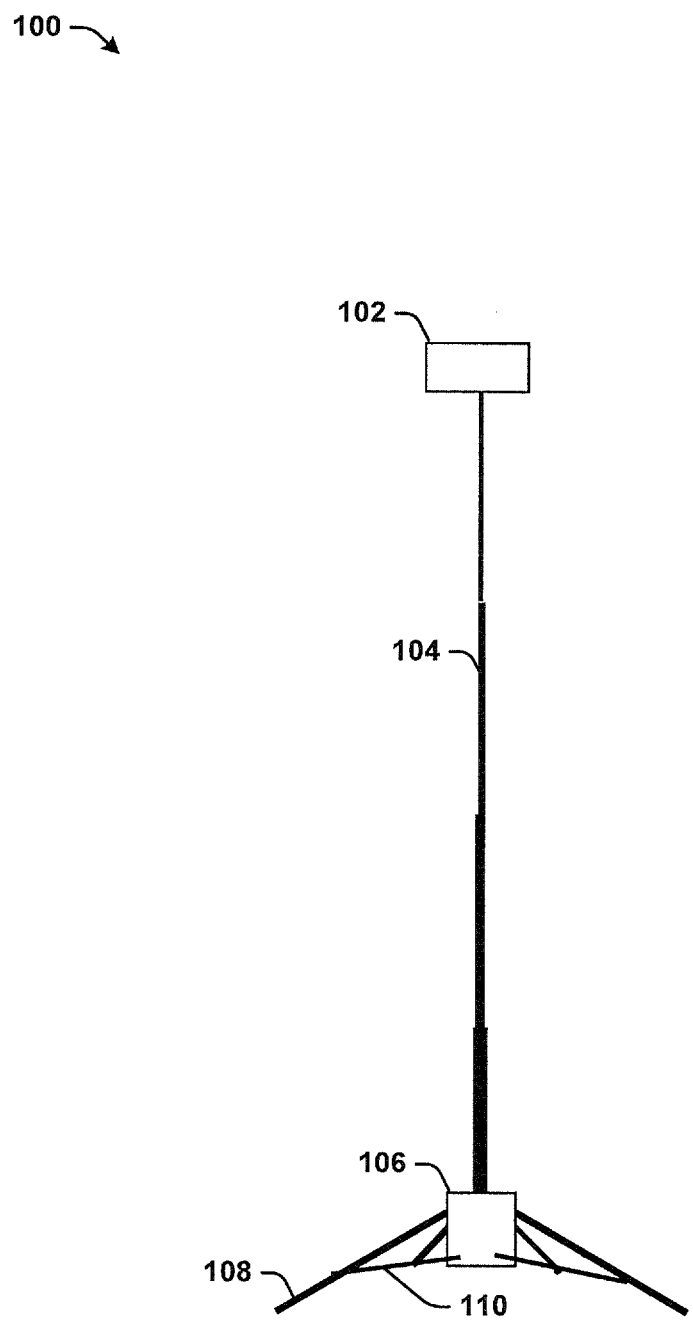
FIG. 1 is a block diagram illustrating an example, non-limiting embodiment of a telescoping monopod and affixed camera in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various embodiments provide for a telescoping monopod or a tripod with a telescoping pole that allows an imaging device to be mounted thereon and be remotely controlled via a mobile device. A mounting assembly on the monopod can include motors that facilitate pan and tilt functionality, and a controller that operates the motors and the imaging device. The controller can control the motors and imaging device based on instruction received wirelessly from a mobile device. A base enclosure in the monopod can include one or more batteries that power the imaging device and mounting assembly and also include memory for digital storage of the images recorded by the imaging device.

Turning now to the illustrations, FIG. 1 illustrates a block diagram of an example, non-limiting embodiment of a telescoping monopod and affixed camera in accordance with various aspects described herein. The monopod and camera apparatus 100 comprises an imaging device 102 (e.g., camera, video recorder, and etc) that is mounted on a telescoping pole 104. The telescoping pole has a base section 106 with foldable stabilizing supports 108 that have supporting arms 110.

Figure 3:
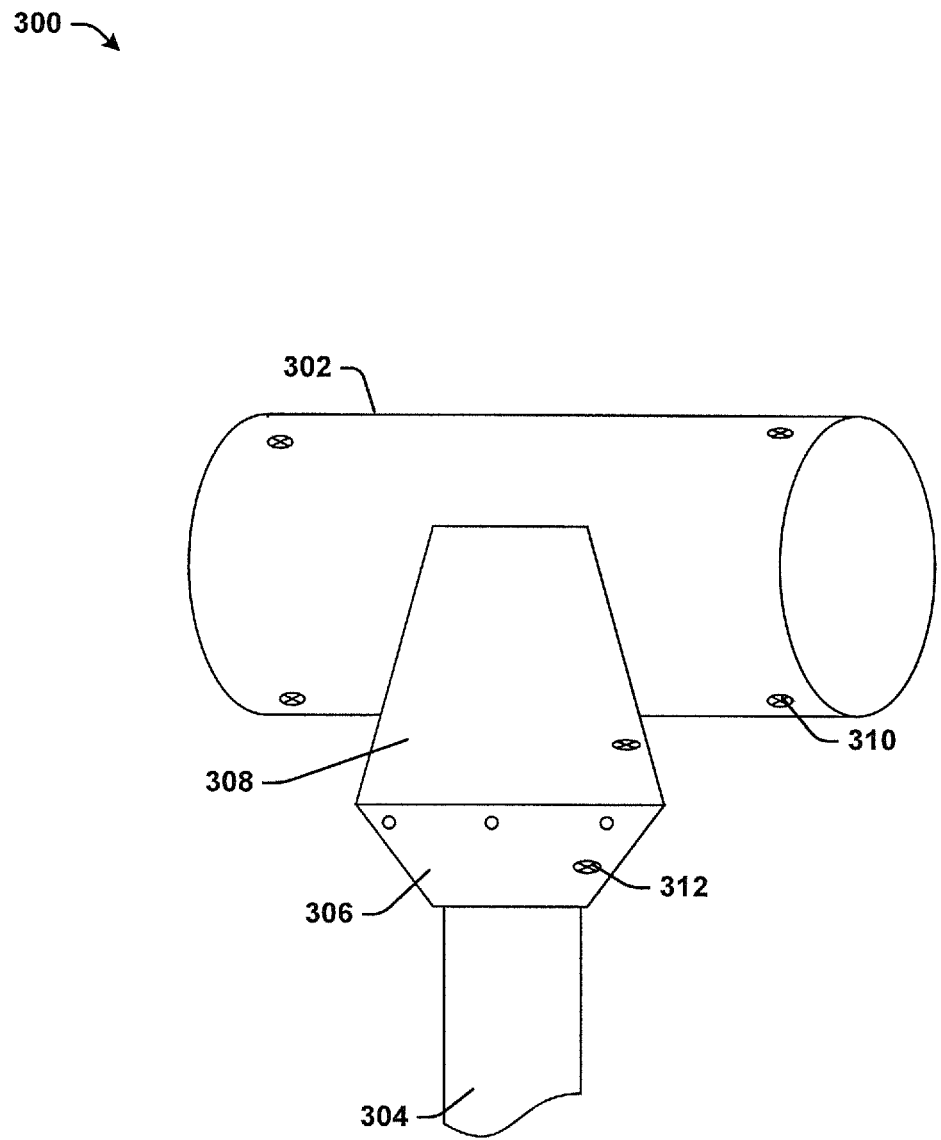
FIG. 3 is a block diagram illustrating an example, non-limiting embodiment of a camera and a mounting assembly in accordance with various aspects described herein.
Figure 4:
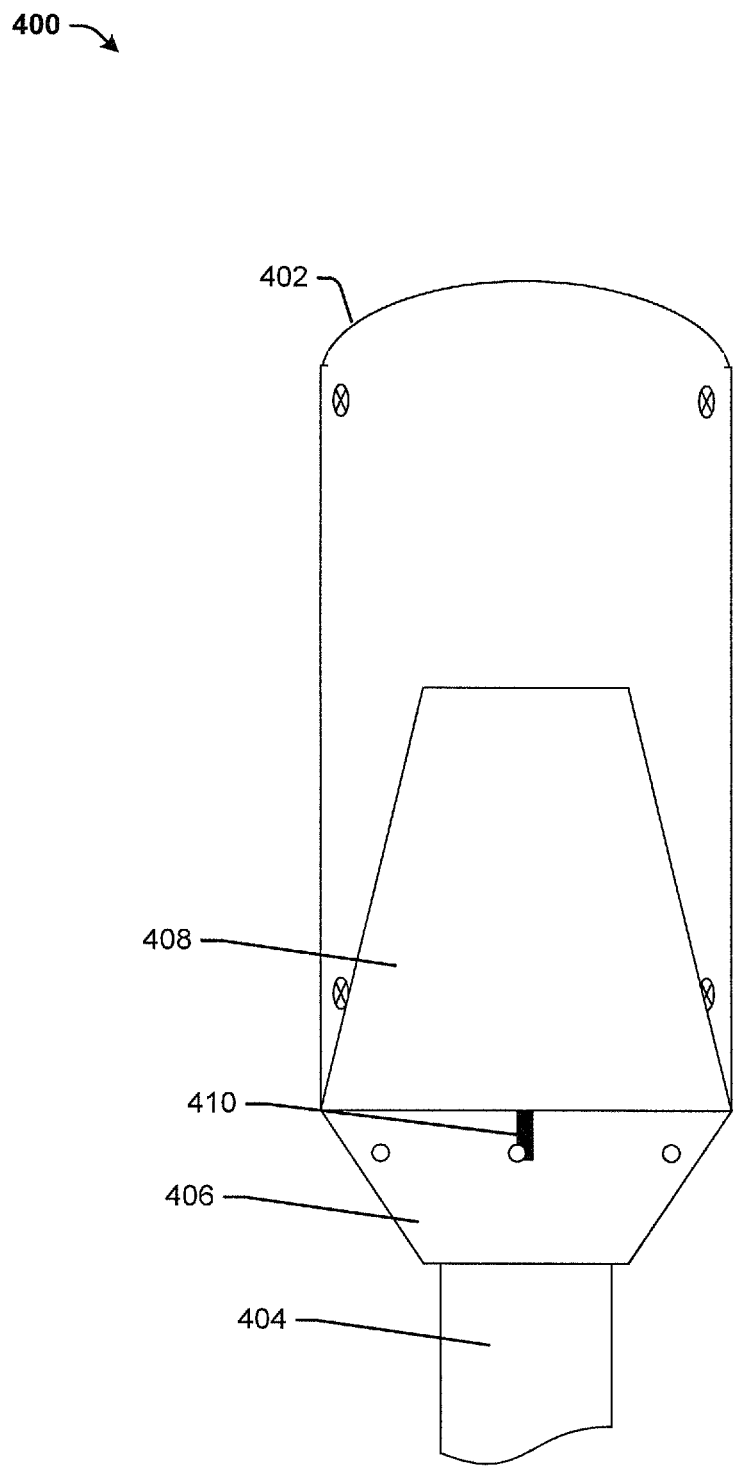
FIG. 4 is a block diagram illustrating an example, non-limiting embodiment of a camera and a mounting assembly in a stowed and locked configuration in accordance with various aspects described herein.
Figure 5:
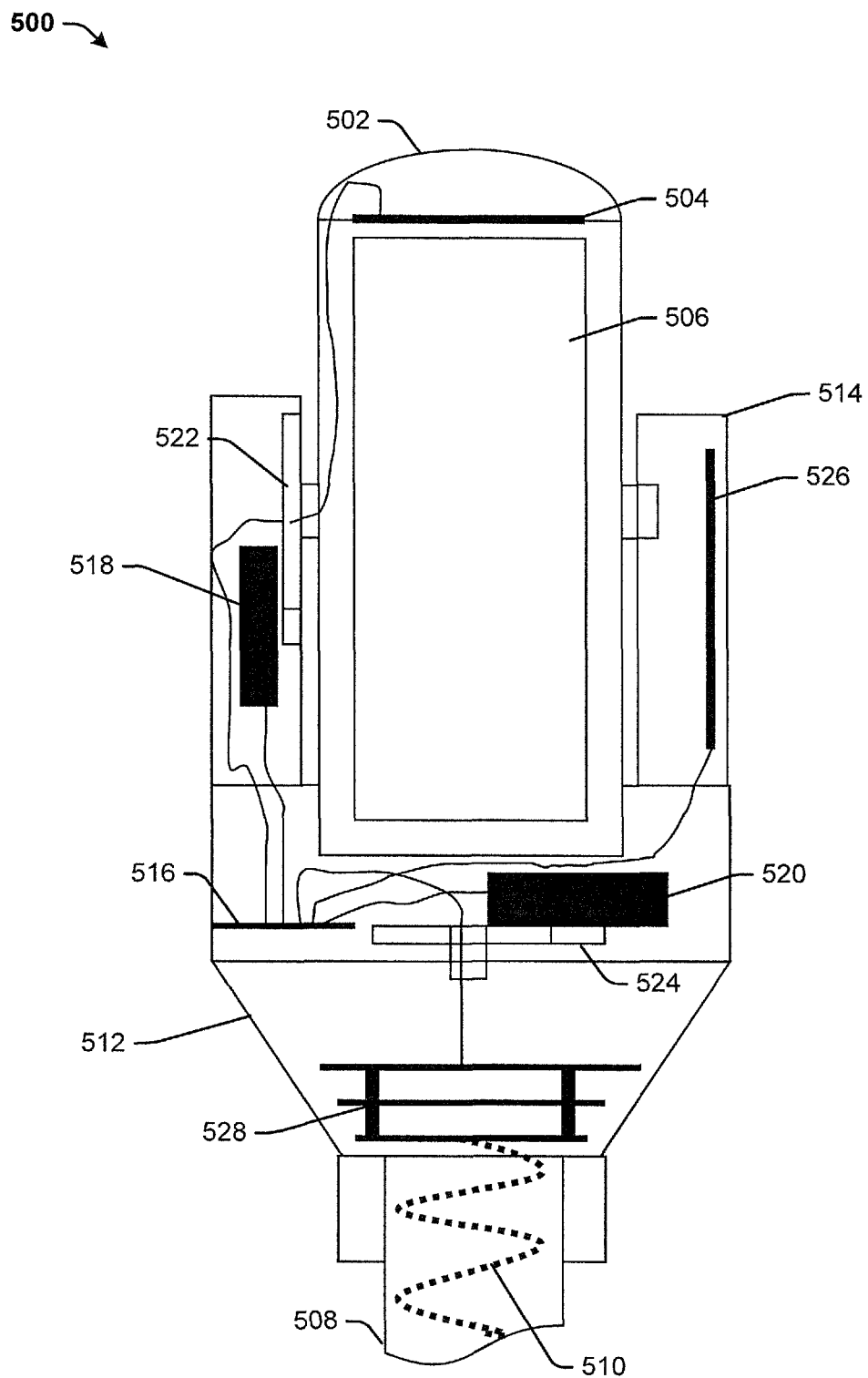
FIG. 5 is a block diagram illustrating an example, non-limiting embodiment of a camera and a mounting assembly in accordance with various aspects described herein.

In an embodiment, the imaging device 102 can be mounted to the telescoping pole 104 via a mounting assembly shown in more detail in FIGS. 3-5. The imaging device 102 can be remotely operated with pan and tilt functionality and images can be captured via remote control from a mobile device application. Power to the imaging device 102 can be supplied from one or more batteries provided in base section 106. The base section 106 can also include slots for memory cards (Secure Digital, Compact Flash, MMC, and other variations thereof). USB and power charging ports can also be included in the base section 106. The memory slots and battery supply can be operatively coupled to the imaging device 102 via a power over Ethernet connection, USB connection, or other standard and/or proprietary power and communication interface.

The telescoping pole 104 can include two or more segments that can slide/telescope into a shorter or longer pole. In an embodiment, the telescoping pole can extend to be taller than three feet tall. At the base of the telescoping pole 104 can be a plurality of stabilizing arms 108 that allow the monopod to stand unassisted. In an embodiment, each of the stabilizers 108 can include a supporting arm 110 that provides additional support to the stabilizers 108. In an embodiment, the monopod 100 can include three stabilizers, but in other embodiments, four or more stabilizers are possible.

Figure 2:
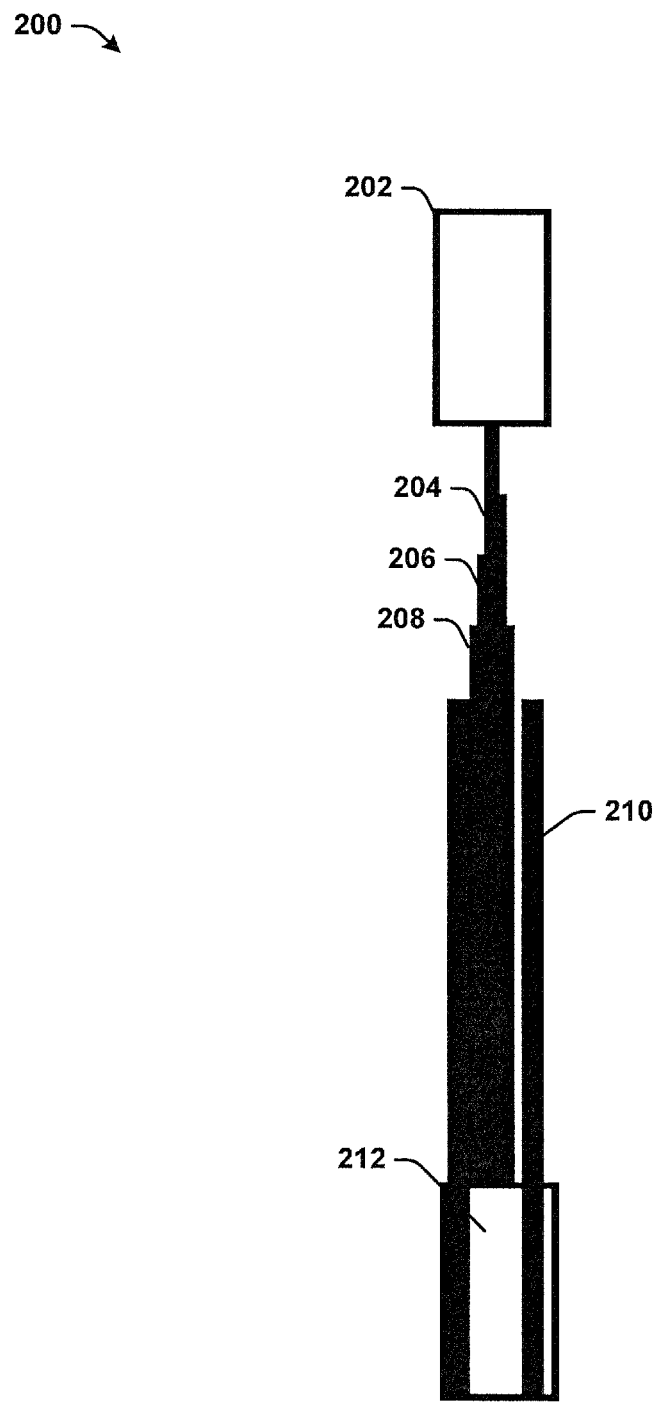
FIG. 2 is a block diagram illustrating another example, non-limiting embodiment of a telescoping monopod and affixed camera in a stowed configuration in accordance with various aspects described herein.

Turning now to FIG. 2, illustrated is a block diagram of another example, non-limiting embodiment of a telescoping monopod and affixed camera 200 in a stowed configuration in accordance with various aspects described herein. At times it may be desirable to collapse the telescoping monopod 200 into a stowed configuration, for example, during transport. During transport, to make the telescoping monopod 200 easier to transport, the telescoping pole can be collapsed with hollow pole segments 204, 206, and 208 sliding into each other. The imaging device 202 can also be tilted upwards and locked into a vertical position relative to the rest of the telescoping monopod 200. This configuration allows a lower profile and prevents damage from occurring to the imaging device 202. The stabilizer arms (e.g., stabilizer arm 210) can also fold upwards around the base section 212 to reduce the longitudinal length of the telescoping monopod 200.

In an embodiment, the telescoping monopod 200 can be folded manually into the stowed configuration, and in other embodiments, the telescoping monopod 200 can contain motors and/or actuators that change the configuration of the telescoping monopod 200 in response to a command received wirelessly.

Turning now to FIG. 3, illustrated is a block diagram of an example, non-limiting embodiment of a camera and a mounting assembly in accordance with various aspects described herein. The apparatus 300 can include an imaging device 302 that is attached to the telescoping pole 304 by a mounting assembly that comprises an upper mounting assembly 308 and a lower mounting assembly 306. One or more microphones (e.g., 310 and 312) can be built into either of upper mounting assembly 308, lower mounting assembly 306, or imaging device 302. In other embodiments, either of the mounting assemblies or the imaging device 302 can contain an audio input port that facilitates operation of an external microphone.

The upper mounting assembly 308 and lower mounting assembly 306 can include motors (shown in more detail in FIG. 5) that are operable to facilitate panning and tilting the imaging device 302. The lower mounting assembly can contain one or more motors to facilitate panning the imaging device in a range of azimuthal angles and the upper mounting assembly 308 can contain one or more motors to tilt the imaging device 302 in a range of altitude or elevation angles. The lower mounting assembly can rotate radially around the telescoping pole 304, whereas the upper mounting assembly 308 can tilt the imaging device 302 up and down (and in some embodiments, with a 360 degree angle of rotation).

In an embodiment, upper mounting assembly 308 comprises two vertical members that each are coupled to imaging device 302 and provide an axis of rotation around which the imaging device 302 tilts (i.e., a fork mount). In other embodiments, the upper mounting assembly 308 comprises a single vertical member to which the imaging device 302 is mounted thereon.

Turning now to FIG. 4, illustrated is a block diagram of an example non-limiting embodiment of a camera and a mounting assembly in a stowed and locked configuration in accordance with various aspects described herein. Embodiment 400 includes an imaging device 402 mounted to a vertical member of an upper mounting assembly 408. The upper mounting assembly 408 is attached to a lower mounting assembly 406 which is fixably attached to telescoping pole 404.

In the stowed position shown in embodiment 400 (which is itself another view of the embodiment shown in FIG. 2), imaging device 402 is locked in an upright position relative to the telescoping pole 404 by locking mechanism 410. This configuration allows for a lower/narrower profile to prevent damage imaging device 402 and to make the apparatus easier to stow/transport. Locking mechanism 410 can also lock the radial movement of the lower mounting assembly 406 around the telescoping pole 404. The locking mechanism 410 can be operable to place the imaging device 402 in the upright position.

In an embodiment, the locking mechanism 410 can be operated remotely via an electronic command received wirelessly. In other embodiments, the imaging device 402 can manually be placed in the upright position and the locking mechanism 410 manually engaged.

In another embodiment, the locking mechanism 410 can be activated and/or engaged, even when the apparatus is not in the stowed configuration. This can be done for example when the user doesn't want the imaging device 402 to be disturbed.

Turning now to FIG. 5, illustrated is a block diagram illustrating an example, non-limiting embodiment 500 of a camera and a mounting assembly in accordance with various aspects described herein. Embodiment 500 includes an imaging device 502 that is attached to one or more vertical members of an upper mounting assembly 514. Upper mounting assembly is connected to lower mounting assembly 512 which is coupled to telescoping pole 508.

Imaging device 502 can include a light sensor (e.g., CMOS and/or CCD chip) 504 that records images via light entering the imaging device 502 through lenses 506. Motors in the imaging device 502 can actuate the lenses in order to focus, change aperture, focal length and other common imaging techniques. Imaging device 502 can be detachable allowing other imaging devices to be used with the mounting assembly and telescoping monopod 508. Each imaging device that is used can also be controlled via controllers 516 and 528 in the mounting assembly. The imaging device 502 can record single images (i.e., photographs), or can serve to record video along with audio recorded via the internal microphones or external attached microphones.

Motor 518 can operate to tilt imaging device 502 via a set of gears 522. In a different embodiment, the motor can directly tilt the imaging device without gears. It is to be appreciated that while FIG. 5, shows one motor for the vertical members of upper mounting assembly 514, in other embodiments, each of the vertical members can comprise a motor and accompanying gears to tilt imaging device 502. In a similar fashion, motor 520 can operate to pan the imaging device 502 around the telescoping monopod 508 via a set of gears 524. When panning the imaging device 502, in some embodiments, the motor 520 can operate to rotate the entire lower mounting assembly 512 around the telescoping monopod 508, and in other embodiments, the motor 520 can operate to rotate the upper mounting assembly 514 relative to the lower mounting assembly 512.

A coiled cable 510 can provide power to the components in the mounting assembly and imaging device 502. The coiled cable 510 can be linked to the base enclosure (e.g., base section 106) through the hollow telescoping pole segments (e.g., pole 508). The coiled cable 510 can also serve to transmit recorded images to the storage device in the base enclosure. The coiled cable can be a power over Ethernet connection in some embodiments, but in other embodiments, can be a USB connection, or can be one or more of other standard/proprietary communication and power supply connections.

One or more controllers 516 and 528 can serve to operate the imaging device 502 and motors 518 and 520 based on commands received wirelessly via wireless antenna 526. The wireless antenna 526 and controllers 516 and 528 can receive signals via Wi-Fi (e.g., IEEE 802.11 b,g,n,ac, and etc) WIMAX protocol, UltraWideband protocol, Bluetooth protocol, Zigbee protocol or other wireless protocol. In an embodiment, the controllers 516 and 528 can receive signals over wireless antenna 526 via a cellular (e.g., CDMA, GSM, LTE, EDGE, GPRS and etc.) network signal.

In an embodiment, the controllers 516 and 528 can receive commands wirelessly, and then implement the commands by operating motors 518 and 520, locking mechanisms, and also operating imaging device 502 (e.g., zooming, focusing, setting shutter speed, aperture, triggering the shutter, and etc). In an embodiment, the controllers 516 and 528 can also send recorded images to the user and also provide live view functionality to the controlling mobile device.

Alternatively, the controllers 516 and 528 can autonomously analyze the images captured by the device and analyze the scene Through the use of video analytic, the controllers can identify relevant objects in the scene and make a decision about how to pan, tilt, zoom, and focus the imaging device to best capture the scene. Additionally the controller can send meta-data about the analysis (e.g. object type, location, and velocity) to other cameras in the area through wireless or wired transmission. The controllers can also receive similar data from other cameras and use that data to improve its own analytics.

Figure 6:
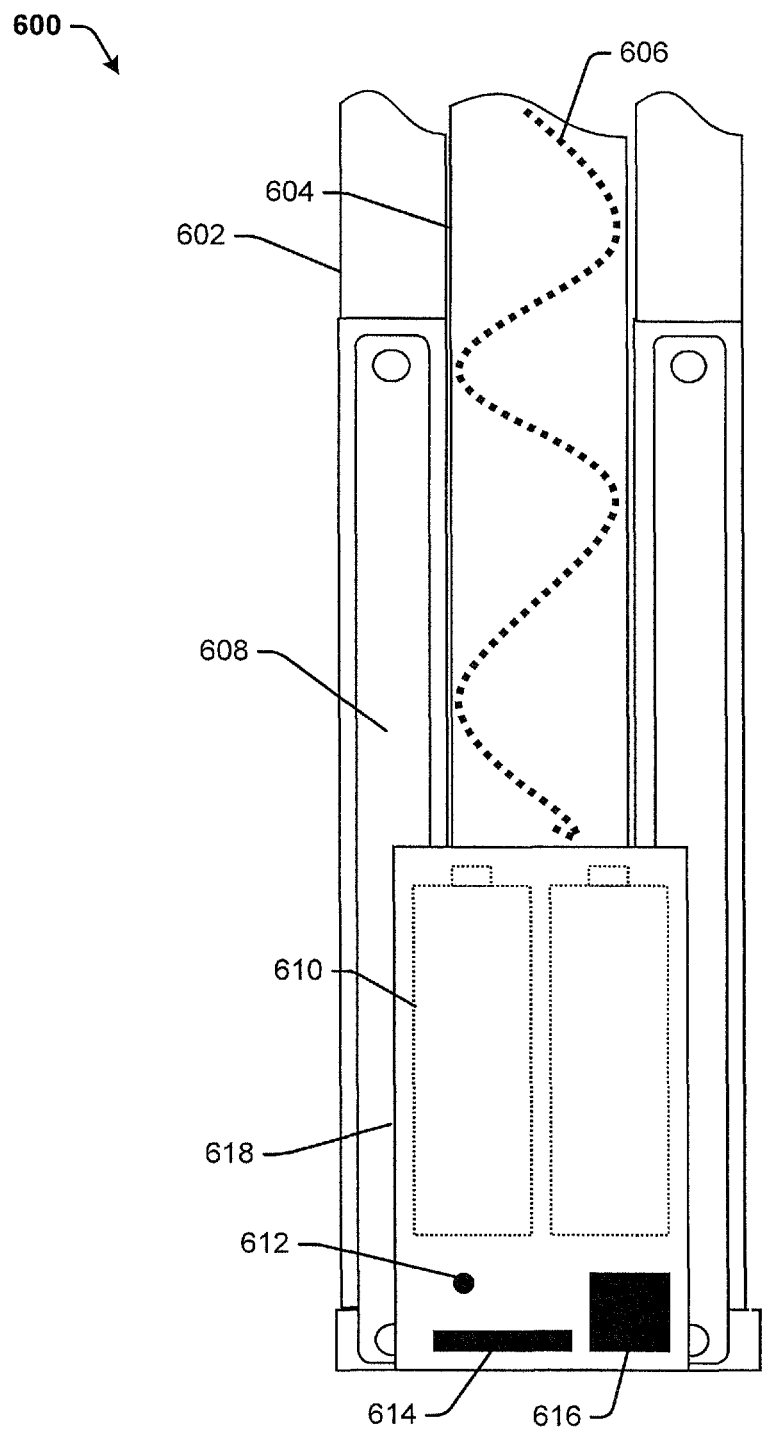
FIG. 6 is a block diagram illustrating an example, non-limiting embodiment of a base enclosure in accordance with various aspects described herein.

Turning now to FIG. 6, illustrated is a block diagram of an example, non-limiting embodiment 600 of a base enclosure 518 in accordance with various aspects described herein. Base enclosure 618 can affixed to a bottom end of a telescoping pole 604. Also attached to the base enclosure 618 can be a one or more stabilizing arms 602 that can be folded up or deployed depending on whether the apparatus is in use or not. The stabilizing arm can also be coupled to a supporting arm 608 that provides extra support for the stabilizing arm when deployed.

The base enclosure 618 can include one or more batteries 610. These batteries can be replaceable batteries or rechargeable and can be in number of different forms depending on the embodiments. For instance, the batteries 610 can be one or more of AA, AAA, C, D, batteries, or can be 9-volt batteries, and/or other styles of battery.

The base enclosure 618 can also include an audio input port 612 that allows an external microphone to be attached. The base enclosure can also include an memory card slot 614 that can in different embodiments receive Secure Digital cards, Compact Flash Cards, and variants thereof. In some embodiments, the base enclosure 618 can include built-in non-removable memory. A USB port or Ethernet port 616 can be used to communicatively couple to the non-removable built-in memory or can be used to otherwise facilitate communications with the apparatus. A coiled cable 606 that links to the mounting assembly and imaging device can be coiled through the telescoping pole.

Figure 7:
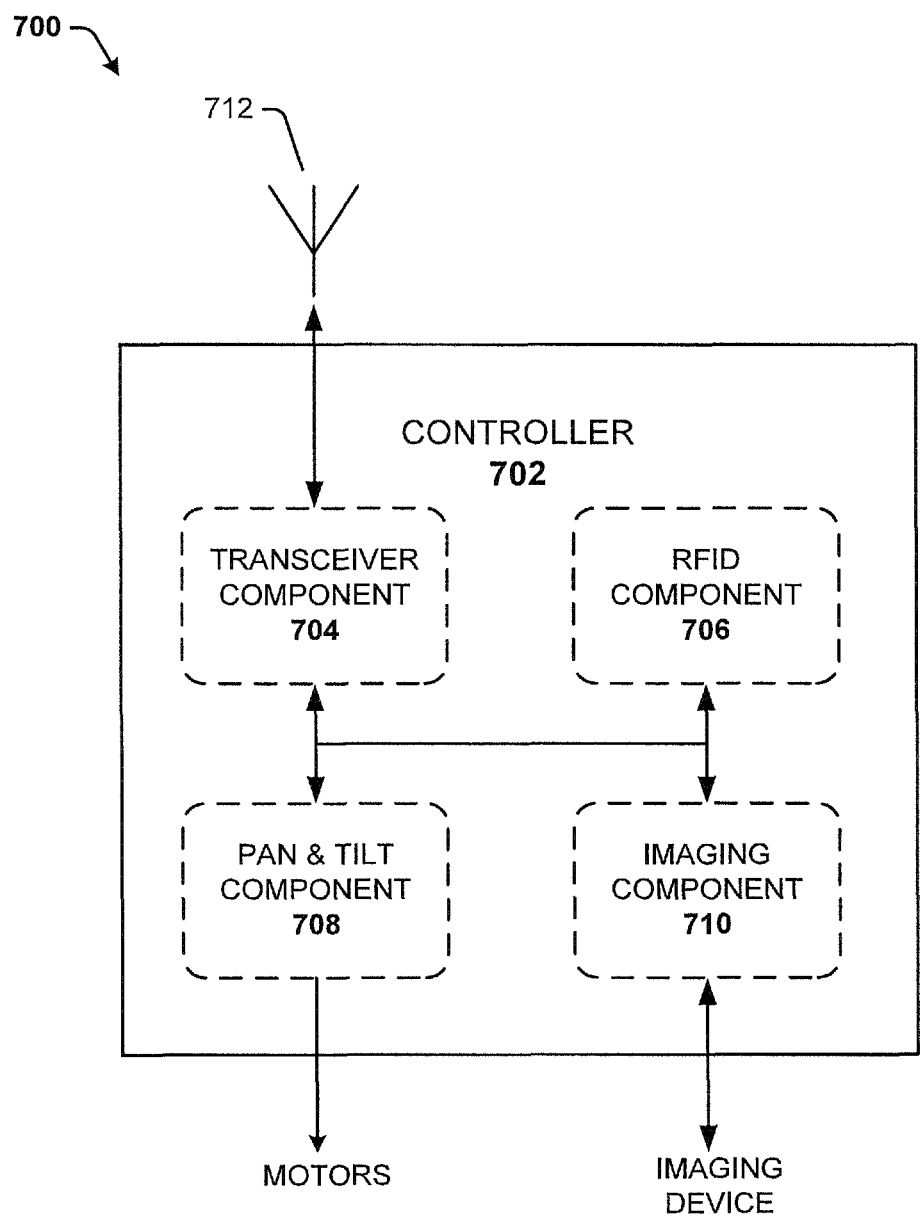
FIG. 7 is a block diagram illustrating an example, non-limiting embodiment of a controller system in accordance with various aspects described herein.

Turning now to FIG. 7, illustrated is a block diagram illustrating an example, non-limiting embodiment of a controller system in accordance with various aspects described herein. Controller system 700 can include a controller 702 (e.g. controller 516 or 528) that includes a transceiver component 702 configured to facilitate communications with a mobile device via wireless antenna 712. A pan and tilt component 708 can facilitate operations of motors in the mounting assembly (e.g., motors 518 and 520) based on instructions received from the mobile device via transceiver component 704. Imaging component 710 can operate the imaging device (zoom, focus, set shutter speed, trigger shutter, record, etc) also based on instructions received via the transceiver component 704. It can also analyze the incoming images from the imaging device, receive and analyze incoming meta-data from other cameras, create video analytics meta-data to be shared with other cameras, and compress the images for storage. A RFID component 706 can read RFID tags that are nearby (e.g. by detected by a wireless antenna. The RFID component 706 can also then send information stored in the RFID tag to other cameras and apparatuses that are located nearby via the transceiver component 704.

In an embodiment, transceiver component 704 can communicate with other apparatuses nearby. For instance, a mobile device may be controlling multiple imaging apparatuses, in order to focus on a particular event or object. Multiple monopod camera apparatuses can be setup and the controllers on each apparatus (e.g., controller 702) can communicate with each other to track the object and provide continuous coverage.

Figure 8:
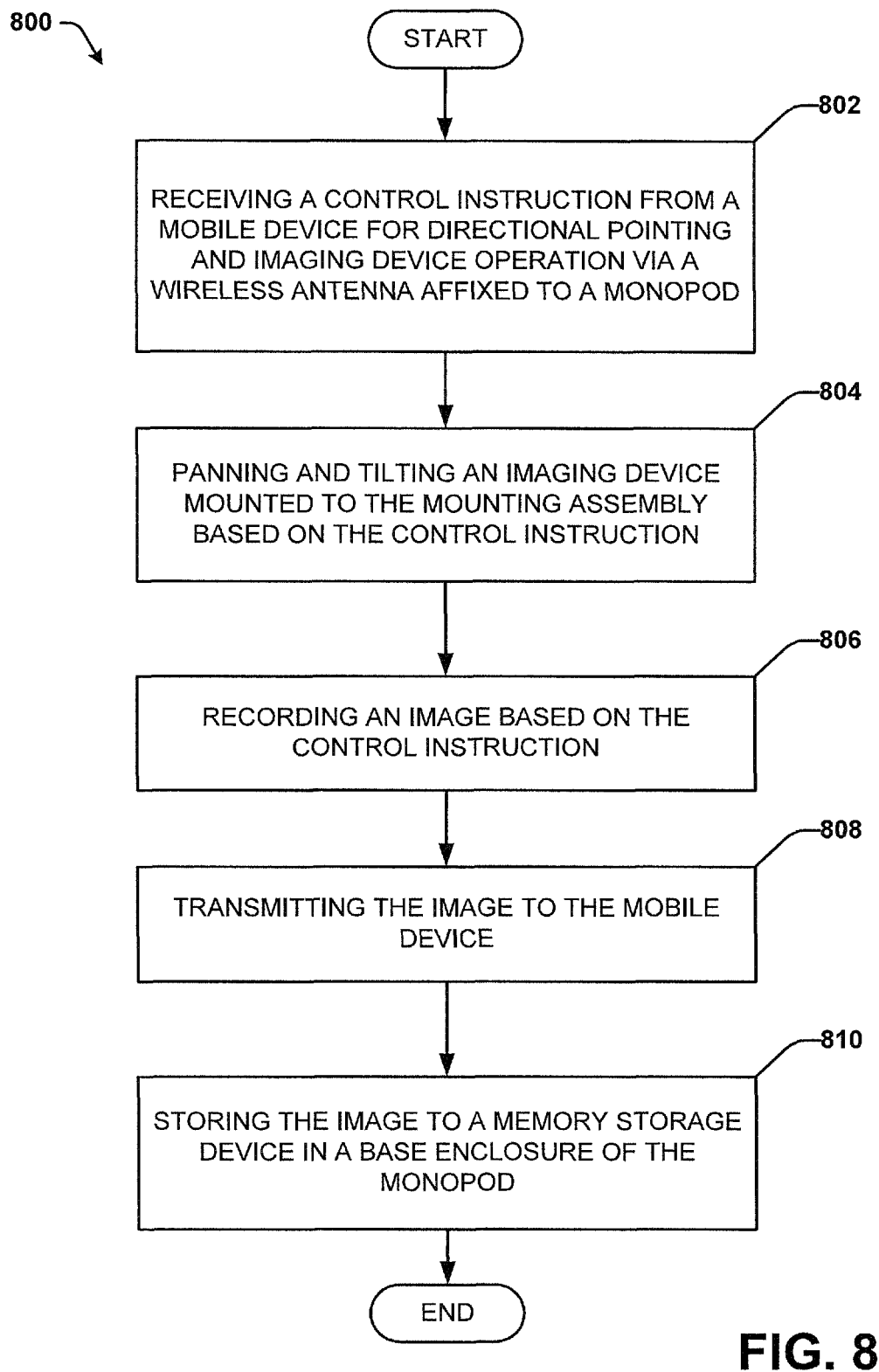
FIG. 8 illustrates a flow diagram of an example, non-limiting embodiment of a method for remote controlling a camera according to various aspects described herein.

FIG. 8 illustrates processes in connection with the aforementioned systems. The process in FIG. 8 can be implemented for example by systems 100, 200, 300, 400, 500, 600, and 700 illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for providing a power grid interface on a chip.

Method 800 can start at 802, where a control instruction is received from a mobile device for directional pointing and imaging device operation via a wireless antenna affixed to a monopod. At 804, an imaging device mounted to the mounting assembly can be panned and tilted based on the control instruction. At 806, an image can also be recorded based on the control instruction.

At 808 the image can be transmitted to the mobile device via a wireless antenna (e.g., by transceiver component 704) and at 810, the image can be stored to a memory storage device in a base enclosure of the monopod.

Example Networking Environment

Figure 9:
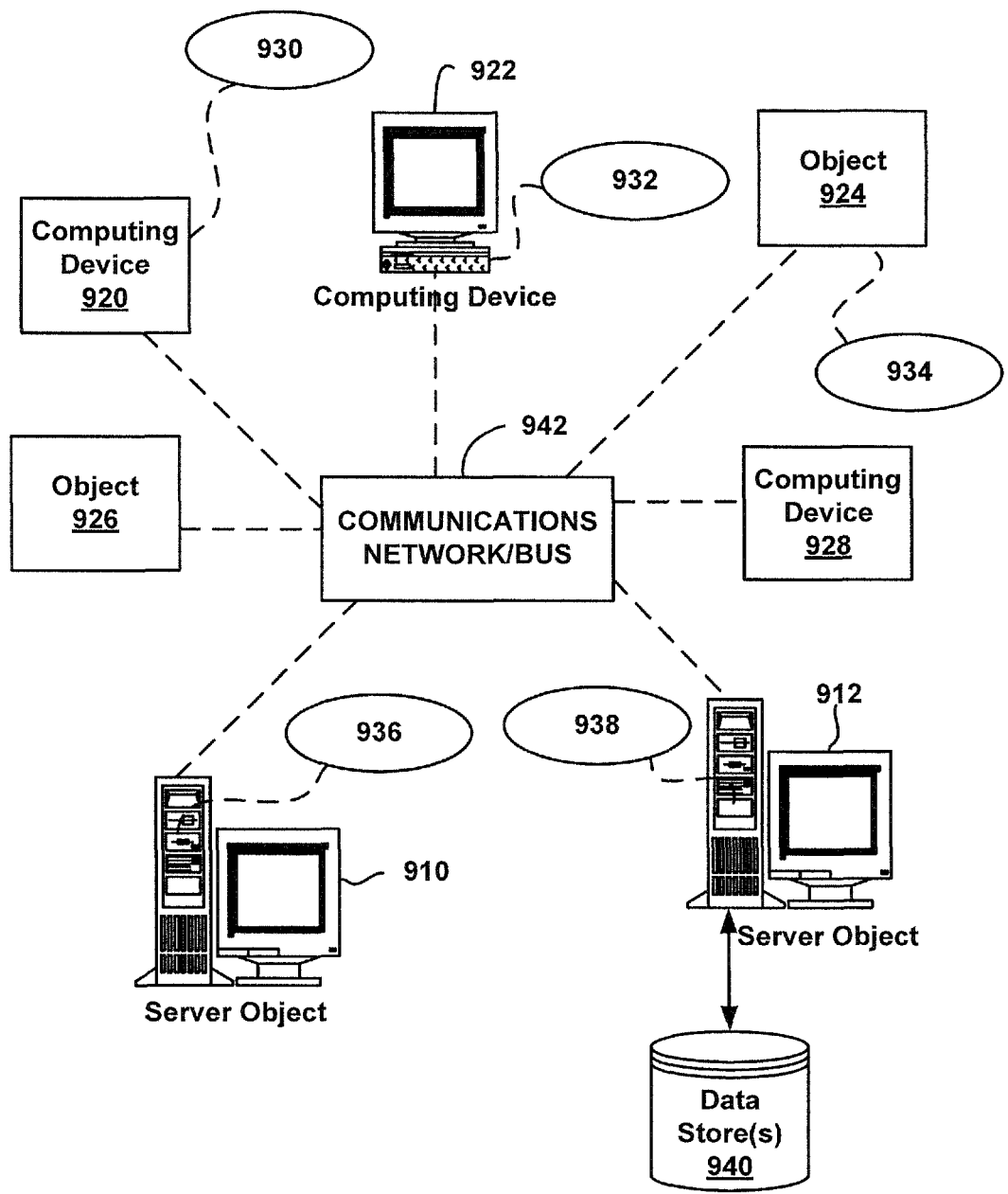
FIG. 9 illustrates a block diagram of an example electronic computing environment that can be implemented in conjunction with one or more aspects described herein.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938 and data store(s) 940. It can be appreciated that computing objects 910, 912, etc. and computing objects or devices 920, 922, 924, 926, 928, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 940 can include one or more cache memories, one or more registers, or other similar data stores disclosed herein.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 942, either directly or indirectly. Even though illustrated as a single element in FIG. 9, communications network 942 may comprise other computing objects and computing devices that provide services to the system of FIG. 9, and/or may represent multiple interconnected networks, which are not shown. Each computing object 910, 912, etc. or computing object or devices 920, 922, 924, 926, 928, etc. can also contain an application, such as applications 930, 932, 934, 936, 938, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 942 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Example Computing Environment

Figure 10:
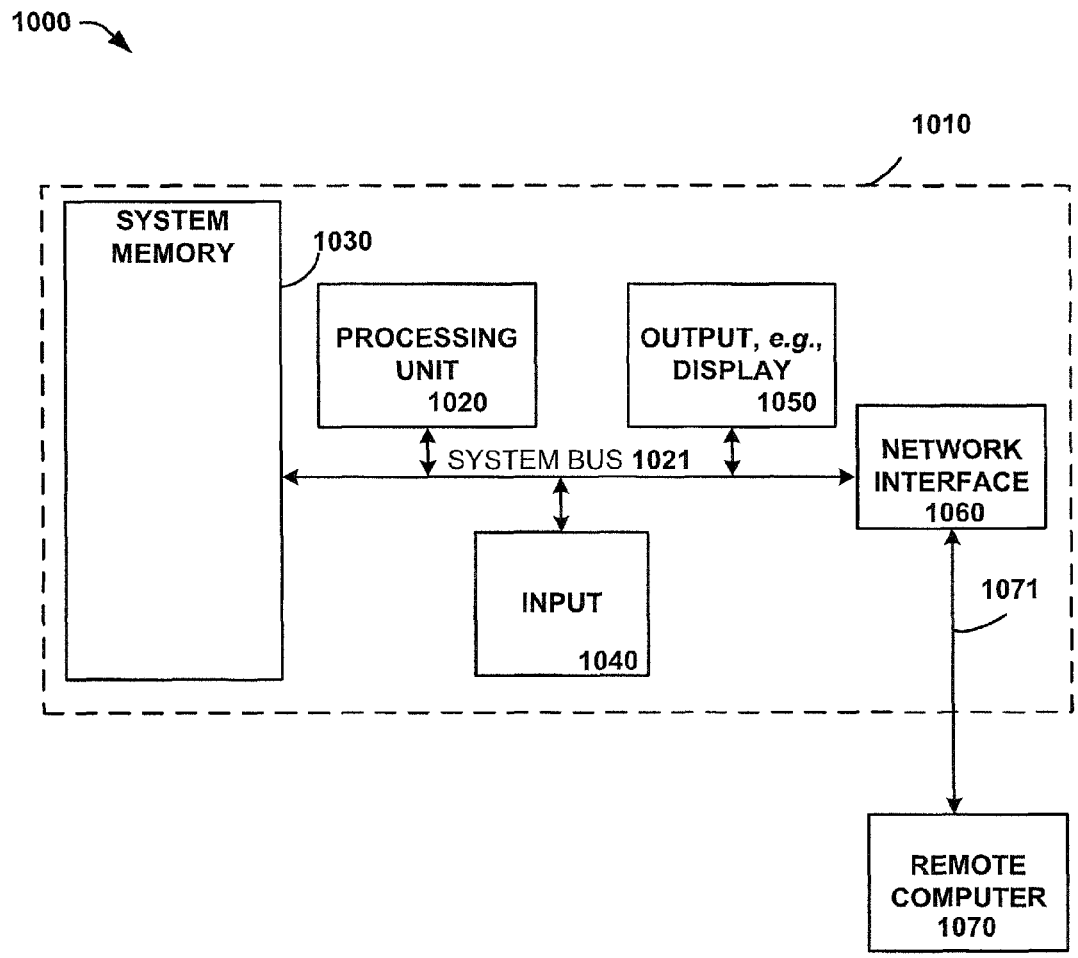
FIG. 10 illustrates a block diagram of an example data communication network that can be operable in conjunction with various aspects described herein.

As mentioned, advantageously, the techniques described herein can be applied to any device and/or network where power management is desirable in a multiprocessor system. It is to be understood, therefore, that handheld, portable and other computing devices and computing objects of all kinds are contemplated for use in connection with the various non-limiting embodiments, i.e., the controllers 516, 528, and 702 as described herein. Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1300.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from device 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modem and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. An apparatus, comprising:
a telescoping monopod that has a base enclosure with foldable stabilizing members;
a mounting assembly, affixed to a distal end of the monopod from the base member, that includes a vertical member configured to mount an imaging device thereon, wherein the mounting assembly includes a first motor configured to pan the imaging device in a range of azimuthal angles, and a second motor configured to tilt the imaging device in a range of elevation angles; and
a controller that pans and tilts the imaging device and facilitates operation of the imaging device either in response to instructions received wirelessly via a wireless antenna attached to the mounting assembly or base enclosure or due to autonomous analysis of a captured image that determines a relevant target object in the captured image based at least in part on metadata received from a camera near the imaging device, and wherein the controller pans and tilts the imaging device to track the relevant target object and generates contextual information about the target object by combining meta-data received from the camera near the imaging device with meta-data received from the autonomous analysis of the captured image.

2. The apparatus of claim 1, wherein the base enclosure comprises a battery that supplies power to the first motor, the second motor, and the imaging device and a memory slot that receives a memory card operable to store images from the imaging device.

3. The apparatus of claim 2, wherein the battery and the memory slot are communicably coupled to the mounting assembly via a power over Ethernet connection facilitated by an Ethernet cable that is routed through the telescoping monopod.

4. The apparatus of claim 2, wherein the battery and the memory slot are communicably coupled to the mounting assembly via a USB connection that is routed through the telescoping monopod.

5. The apparatus of claim 1, wherein the telescoping monopod extends to at least three feet tall.

6. The apparatus of claim 1, wherein the imaging device, mounting assembly, or base enclosure comprise at least one audio input port to which an external microphone can be attached.

7. The apparatus of claim 1, wherein the mounting assembly or base enclosure comprises an internal microphone.

8. The apparatus of claim 1, wherein the imaging device is detachable from the mounting assembly.

9. The apparatus of claim 1, wherein the mounting assembly comprises a locking mechanism that locks movement related to panning and tilting the imaging device.

10. The apparatus of claim 9, wherein the locking mechanism can be engaged manually.

11. The apparatus of claim 9, wherein the locking mechanism can be engaged electronically in response to an instruction received wirelessly.

12. The apparatus of claim 9, wherein the locking mechanism is operable to lock the imaging device for stowing in a longitudinal direction with respect to the monopod.

13. The apparatus of claim 1, wherein the controller can transmit images and audio to a mobile device via the wireless antenna.

14. A method, comprising:
receiving a control instruction from a mobile device for directional pointing and imaging device operation via a wireless antenna affixed to a monopod;
panning and tilting an imaging device mounted to the monopod based on the control instruction;
recording an image with the imaging device based on the control instruction;
transmitting the image to the mobile device;
storing the image to a memory storage device in a base enclosure of the monopod or a memo storage in the imaging device;
determining a target object in the image based at least in part on video analytics and metadata received from another imaging device near the imaging device;
sending another control instruction to pan and tilt the imaging device to track the target object; and
generating contextual information about the target object by combining the meta-data received from the another imaging device near the imaging device with image analysis metadata determined from analyzing the recorded image from the imaging device.

15. The method of claim 14, further comprising:
receiving power from a battery stored in the base enclosure.

16. The method of claim 14, further comprising:
locking the imaging device and the mounting assembly in a stowed position for transport in response to receiving a stow command wirelessly via the wireless antenna.

17. The method of claim 14, further comprising:
receiving audio input via a input port in the base enclosure, mounting assembly, or imaging device.

18. A system, comprising:
a processor; and
a memory that stores executable instructions that, when executed by the processor, facilitate performance of operations, comprising:
receiving a control instruction from a mobile device for directional pointing and imaging device operation via a wireless antenna embedded in a mounting assembly or base enclosure that is affixed to a monopod;

panning and tilting an imaging device mounted to the mounting assembly based on the control instruction;

recording an image with the imaging device based on the control instruction;

transmitting the image to the mobile device;

storing the image to a memory storage device in a base enclosure of the monopod or a memory storage in the imaging device;

determining a target object in the image based on video analytics;

sending another control instruction to pan and tilt the imaging device to track the target object; and receiving meta-data from an image analysis of the target object in an image taken by a camera that is near the imaging device, wherein the meta-data is combined with image analysis metadata determined from the analyzing the recorded image to generate contextual information about the target object.

19. The system of claim 18, wherein the operations further comprise:
   reading a RFID tag that is detected nearby; and
   transmitting information associated with the RFID tag to other imaging devices nearby.

20. The system of claim 18, wherein the operations further comprise:
   locking the imaging device and the mounting assembly in a stowed position for transport in response to receiving a stow command wirelessly via the wireless antenna.

21. The system of claim 18, wherein the operations further comprise:
   receiving audio input via a input port in the base enclosure, mounting assembly, or imaging device.

22. The system of claim 18, wherein the operations further comprise:
   sending metadata about the target object to the another camera, wherein the metadata comprises information relating to at least one of object type, location, and velocity of the target object.

* * * * *